United States Patent
Thommana et al.

(10) Patent No.: US 12,120,651 B2
(45) Date of Patent: Oct. 15, 2024

(54) INFRASTRUCTURELESS 5G

(71) Applicant: Rockwell Collins, Inc., Cedar Rapids, IA (US)

(72) Inventors: John V. Thommana, Cedar Rapids, IA (US); James A. Stevens, Lucas, TX (US)

(73) Assignee: Rockwell Collins, Inc., Cedar Rapids, IA (US)

(*) Notice: Subject to any disclaimer, the term of this patent is extended or adjusted under 35 U.S.C. 154(b) by 670 days.

(21) Appl. No.: 17/368,121

(22) Filed: Jul. 6, 2021

(65) Prior Publication Data
US 2023/0011379 A1    Jan. 12, 2023

(51) Int. Cl.
| H04W 72/04 | (2023.01) |
| G01S 19/11 | (2010.01) |
| H04B 7/185 | (2006.01) |
| H04W 56/00 | (2009.01) |
| H04W 72/0453 | (2023.01) |
| H04W 84/04 | (2009.01) |
| H04W 84/18 | (2009.01) |

(52) U.S. Cl.
CPC ....... *H04W 72/0453* (2013.01); *G01S 19/115* (2019.08); *H04B 7/18539* (2013.01); *H04W 56/001* (2013.01); *H04W 84/04* (2013.01); *H04W 84/18* (2013.01)

(58) Field of Classification Search
None
See application file for complete search history.

(56) References Cited

U.S. PATENT DOCUMENTS

| 9,635,631 B2 | 4/2017 | Lee et al. |
| 9,927,807 B1 | 3/2018 | Ganjoo |
| 10,687,220 B2 | 6/2020 | Carpenter et al. |

(Continued)

FOREIGN PATENT DOCUMENTS

| EP | 3593089 A1 | 1/2020 |
| EP | 3665950 A4 | 3/2021 |

(Continued)

*Primary Examiner* — Willie J Daniel, Jr.
(74) *Attorney, Agent, or Firm* — Suiter Swantz IP

(57) ABSTRACT

A method and system for operating an ad hoc communication network under suboptimal commercial global navigation satellite system (GNSS) conditions and a loss of a base station communication link is disclosed. The method includes configuring the ad hoc communication network to operation in in-band or out-of-band mode, allowing device-to-device D2D communication. The method further includes configuring the ad hoc communication system to operate in overlay mode, sharing communication resources between network-controlled resources and D2D resources. The method further includes configuring the D2D resources with a base station precedent to the loss of the base station communication link and enabling the ad hoc communication network to operate in frequency hopping mode. The method further includes disabling physical sidelink control channel synchronization and/or resource management within the ad hoc communication network. In some embodiments of the method, and configuring the ad hoc communication network to include at least one nonstandard-GNSS time-synchronization method.

10 Claims, 10 Drawing Sheets

(56) References Cited

U.S. PATENT DOCUMENTS

| | | | |
|---|---|---|---|
| 2015/0065154 A1* | 3/2015 | Van Phan | H04W 72/23 |
| | | | 455/450 |
| 2017/0019942 A1 | 1/2017 | Ko et al. | |
| 2021/0105787 A1 | 4/2021 | Park et al. | |
| 2021/0136845 A1* | 5/2021 | Liu | H04W 76/14 |
| 2022/0278882 A1* | 9/2022 | Back | H04L 27/2614 |

FOREIGN PATENT DOCUMENTS

| | | |
|---|---|---|
| GB | 2565559 A | 2/2019 |
| WO | 2020033089 A1 | 2/2020 |
| WO | 2020092751 A1 | 5/2020 |
| WO | 2020114691 A1 | 6/2020 |

* cited by examiner

INFRASTRUCTURELESS 5G

BACKGROUND

5G Proximity Services (ProSe), also known as Device-to-Device (D2D) communication, enable direct ad-hoc connectivity with complex topologies as well as resource sharing between multiple base station resources. Generally, ProSe systems require at least one base station if two or more stranded nodes (e.g., 5G cell phones) require ad-hoc connectivity. There are several reasons for this requirement; ProSe generally uses LTE uplink resources for ad-hoc connectivity; timing and network synchronization services are generally provided by the base station; base stations rely on commercial GPS for timing; neighboring base stations reuse the same frequencies in neighboring cells; and proper synchronization and inter-network coordination is required for interference mitigation and capacity maximization. While ProSe supports D2D in "No Coverage" modes, operating in these modes incurs time drifts and interference from nearby nodes operating in a similar mode There are many tactical environments where 5G nodes must be able to operate in a stand-alone, or infrastructureless, mode. For example, for firefighters fighting a fire in a remote area communicating amongst each other in an ad hoc network having a single base station, D2D connectivity still allows the firefighters to communicate directly via their user devices. In another example, for a host of attritable air launched effects (ALE) being launched from a helicopter. The helicopter can act as a 5G Base Station such that the ALE can be synchronized to the base station, but once they fly away from the helicopter (generally positioned at a standoff distance) the ALE may only have connectivity with the base station for a short duration. Afterwards, the ALEs may need to communicate amongst themselves independent of the base station to complete the mission (e.g., using low cost 5G cellular phones). Multiple sets of ALEs may be launched into the theatre, each with its own independent mission. However, once these ALEs lose connectivity with the base station, the low-cost oscillators and real-time clocks available in the 5G cellular phone aboard the ALE starts drifting, and each set of nodes may begin interfering with each other. This becomes more problematic in areas where commercial global navigation satellite system (GNSS) signals are blocked or otherwise compromised, preventing time synchronization from these technologies.

Accordingly, is desirable to provide timing mechanisms and/or protocols for 5G nodes operating in an infrastructureless mode that are more accurate and stable than current timing systems.

SUMMARY

A method for operating an ad hoc communication network under commercial suboptimal global navigation satellite system (GNSS) conditions and a loss of a base station communication link is disclosed. In one or more embodiments, the method includes configuring the ad hoc communication network to operation in in-band mode, wherein cellular communication and device-to-device (D2D) communication are supported in the same band. In one or more embodiments, the method further includes configuring the ad hoc communication system to operate in overlay mode, wherein communication resources are shared between network-controlled resources and D2D resources. In one or more embodiments, the method further includes configuring the D2D resources with a base station precedent to the loss of the base station communication link. In one or more embodiments, the method further includes enabling the ad hoc communication network to operate in frequency hopping mode.

In some embodiments of the method, the method further includes disabling at least one of physical sidelink control channel synchronization or resource management within the ad hoc communication network. In some embodiments of the method, the method further includes configuring the ad hoc communication network to include a nonstandard-GNSS time-synchronization method.

In some embodiments of the method, the method further includes configuring the ad hoc communication network to operate in out-of-band mode.

In some embodiments of the method, the method further includes configuring the ad hoc network to operate in overlay mode, wherein communication resources are shared between network-controlled resources and D2D resources.

In some embodiments of the method, the ad hoc network further includes a first mission set of first user devices and a second set of second user devices, wherein communication resources for the first mission set and the second mission set are allocated from the base station.

In some embodiments of the method, the ad hoc communication network is configured as a fifth generation (5G) network.

In some embodiments of the method, the first user device is configured as an air launched effect.

A system for operating an ad hoc communication network under suboptimal commercial global navigation satellite system (GNSS) conditions and a loss of a base station communication link is also disclosed. In one or more embodiments, the system includes a first user device. In one or more embodiments, the first user device includes a transceiver configured to communicate with a second user device. In one or more embodiments, the first user device further includes a memory configured to perform an instruction. In one or more embodiments, the first user device further includes a processor configured to execute the instruction stored by the memory. In one or more embodiments, the instruction enables the processor to configure the first user device to operate in in-band mode, wherein cellular communication and device-to-device (D2D) communication are supported in the same band. In one or more embodiments, the instruction enables the processor to further configure the first user device to configure the first user device to operate in overlay mode, wherein communication resources are shared between network-controlled resources and D2D resources. In one or more embodiments, the instruction enables the processor to further configure the first user device to configure the D2D resources with a base station precedent to the loss of the base station communication link. In one or more embodiments, the instruction enables the processor to further configure the first user device to enable the first user device to operate in frequency hopping mode.

In some embodiments of the system, the instruction further enables the processor to disable at least one of physical sidelink control channel synchronization and resource management within the first user device. In some embodiments of the system, the instruction further enables the processor to configure the first user device to include a nonstandard-GNSS time-synchronization method.

In some embodiments of the system, the instruction further enables the processor to configure the first user device to operate in out-of-band-mode.

In some embodiments of the system, the system further includes a second user device configured for D2D communication with the first user device.

In some embodiments of the system, the instruction further enables the processor to enable physical sidelink control channel synchronization for a first user device, wherein the first user device is configured to provide short-range timing to a second user device via the physical sidelink control channel synchronization.

In some embodiments of the system, instruction further enables the processor to assign differing frequency resources between the first user device and a second user device within range of the first user device, wherein the first user device and a second user device are configured with differing mission objectives.

In some embodiments of the system, the ad hoc communication network is configured as a fifth generation (5G) network.

In some embodiments of the system, the first user device is configured as an air launched effect.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
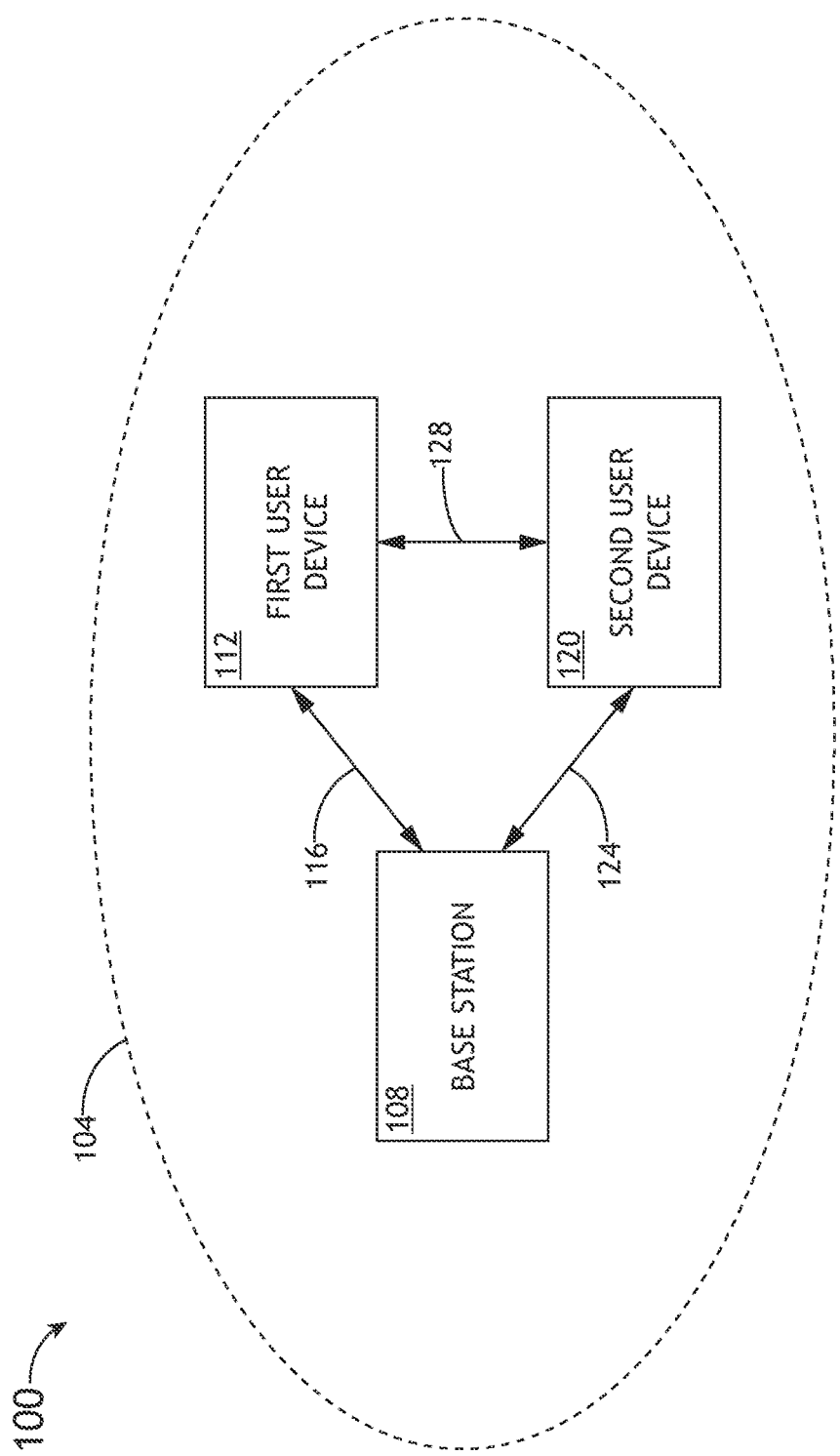
FIG. 1 is a diagram illustrating an ad hoc communication network, in accordance with one or more embodiments of the disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A system and method for operating an ad hoc communication network, such as a fifth generation (5G) network, under suboptimal commercial GNSS conditions and subsequent loss of a base station communication link is disclosed. Suboptimal, or adverse, commercial GNSS conditions are those conditions where commercial GNSS communication is unavailable, and specialized GNSS systems, such as Military-GPS systems, may be available. The ad hoc communication network system may use ProSe methodology, allowing D2D or vehicle-to-anything (V2X) communication. The ad hoc communication network system also uses one or more technologies that allows ProSe communication for those user devices that have been cut off from a base station and cannot access GNSS signals for timing synchronization. The system may include one or more components of, or the entirety of, the ad hoc communication network.

FIG. 1 is a diagram illustrating an ad hoc communication network 100, in accordance with one or more embodiments of the disclosure. The ad hoc communication network 100 operates within a cell 104, a geographical area wherein to or more wireless devices are in connection with each other.

In some embodiments, the ad hoc communication network includes a base station 108 and a first user device 112. The base station 108 and the first user device 112 are configured to communicate with each other via a first signal 116 when the first user device 112 is within the range of the base station 108 and where the first signal 116 is not jammed or otherwise compromised. The first signal 116 may be configured as any wireless signal used by any communication technology or wireless standards including but not limited to 5G, 4G, RF, microwave, Wi-Fi, long term evolution (LTE), E-UTRA (LTE) and IEEE 802.11. While the base station 108 is capable of communicating with the first user device 112, the base station 108 may also provide timing and communication sources required to synchronize the first user device 112 within the cell 104.

In some embodiments, the base station 108 may be configured as a nonmobile station (e.g., a base transceiver 200 and base controller 202 integrated into a permanently placed cell tower) The base station 108 may also be configured as a mobile station including but not limited to a Remote Transmission Node (RTN), an operational facility (OPFAC), a sensitive compartmented information facility (SCIF), a mobile command post (CP) vehicle, a forward unit platform-based array, and airborne relay (e.g., tethered drone). For example, the base station 108 may be configured as a truck designated as a mobile command post. In another example, the base station 108 may be configured as a tactical SCIF integrated into an aircraft.

In some embodiments, the ad hoc communication network 100 further includes a second user device 120 configured to communicate with the base station 108 via a second signal 124. The second user device 120 may be configured to include one or more, or all, characteristics or components of the first user device 112 and vice versa. Accordingly, the second signal 124 may be configured as any type of signal as described above and may be configured as the same type of communication signal as the first signal 116. The base station 108 may be configured to operate as a relay between the first user device 112 and the second user device 120. For example, the ad hoc communication network 100 may be configured as a 5G network, where the first user device 112 communicates with the second user device 120 via the base station using a 5G waveform.

The first user device 112 and/or second user device 120 device may be configured as, or integrated into, any type of apparatus used for communication including but not limited to a radio, a personal mobile device, or a vehicle. For example, the first user device 112 and/or second user device 120 may be configured as a hand-held device used by infantrymen. In another example, the first user device 112 and/or second user device 120 may be configured as a vehicle. For instance, the first user device 112 and/or second user device 120 may be configured as an aircraft. In another example, the first user device 112 and/or second user device 120 may be configured as a military light utility vehicle.

It should be understood that the ad hoc communication network 100 may contain any number of user devices. For example, in addition to the first user device 112 and second user device 120, the ad hoc communication network may contain three, four, or more than a thousand user devices. The ad hoc communication network 100 may also contain defined sets of first user devices 112 and/or second user devices 120 as described herein. Therefore, the above description should not be interpreted as a limitation of the present disclosure, but merely an illustration.

In some embodiments, the first user device 112 and the second user device 120 are configured to communicate directly without the use of the base station 108. For example, if the base station 108 is not responding or is out of range of the first user device 112 and/or the second user device 120, the first user device 112 and the second user device 120 may communicate via a third signal 128. The third signal 128 may be configured as any type of signal as described above and may be configured as the same type of communication signal as the first signal 116 or second signal 124.

Figure 2:
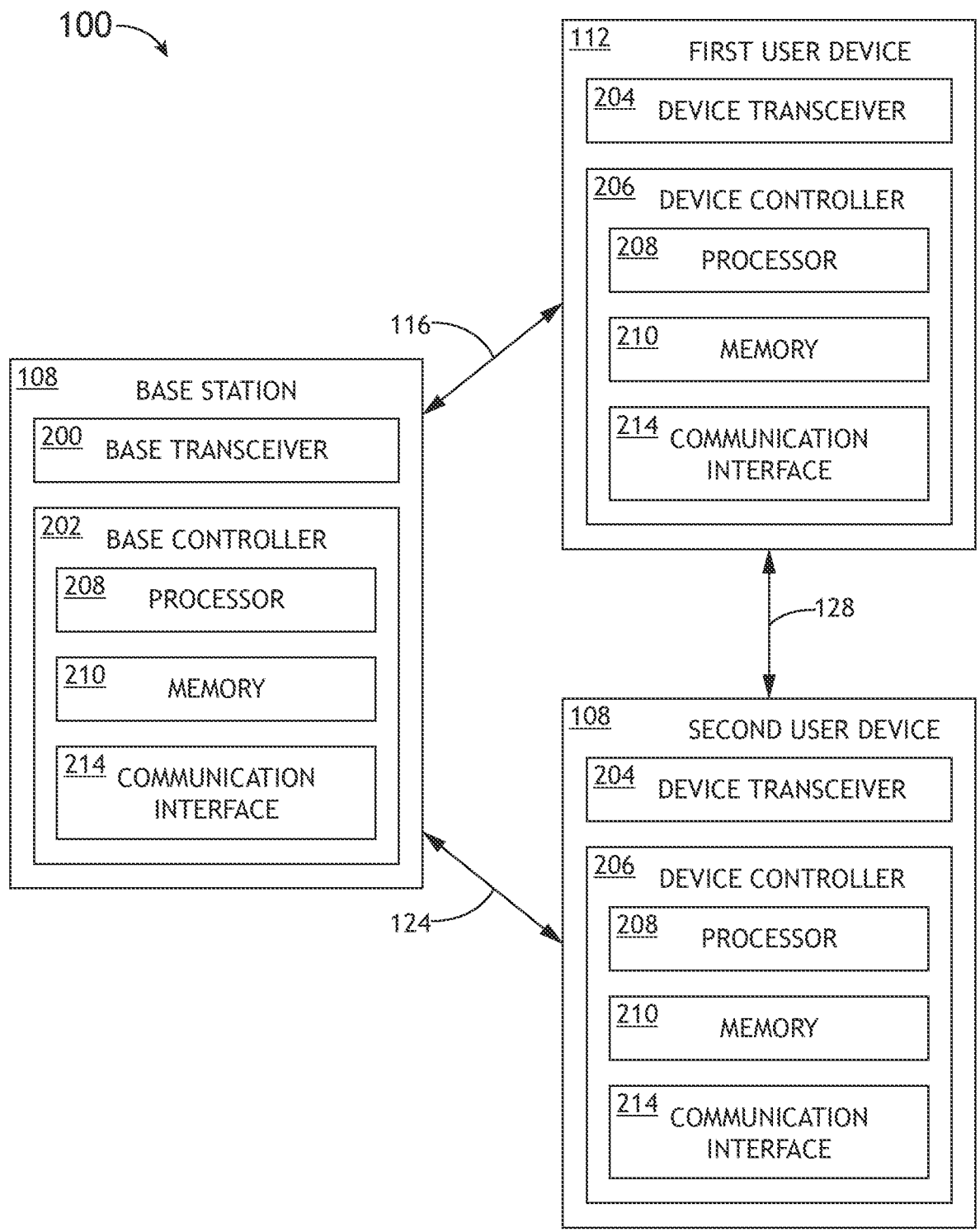
FIG. 2 is a block diagram of the components of the ad hoc communication network 100, in accordance with one or more embodiments of the disclosure.

FIG. 2 is a block diagram of the components of the ad hoc communication network 100, in accordance with one or more embodiments of the disclosure. The base station 108 includes a base transceiver 200 configured to send and receive signals from the first user device 112 and/or second user device 120. The base station further includes a controller configured to provide processing functionality for the base station 108 and/or the base transceiver. The first user device 112 and/or second user device 120 include a device transceiver 204 configured to send and receive signals from the base station 108 and/or other user devices. The first user device 112 and/or second user device 120 further include a device controller configured to provide processing functionality for the device transceiver 204, first user device 112 and second user device.

The base controller 202 and/or the device controller 206 include one or more processors 208 (e.g., micro-controllers, circuitry, integrated circuits, field programmable gate arrays (FPGA), or other processing systems), and resident or external memory 210 for storing data, executable code, and other information. The base controller 202 and/or the device controller 206 can execute one or more software programs embodied in a non-transitory computer readable medium (e.g., memory 210) that implement techniques described herein. The base controller 202 and/or the device controller 206 is not limited by the materials from which it is formed or the processing mechanisms employed therein and, as such, can be implemented via semiconductor(s) and/or transistors (e.g., using electronic integrated circuit (IC) components), and so forth.

The memory 210 can be an example of tangible, computer-readable storage medium that provides storage functionality to store various data and/or program code associated with operation of the base controller 202 and/or the device controller 206, such as software programs and/or code segments, or other data to instruct the base controller 202 and/or the device controller 206, and possibly other components of the base station 108, the first user device and/or second user device 120, to perform the functionality described herein. Thus, the memory 210 can store data, such as a program of instructions for operating the base station 108, the first user device and/or second user device 120, including its components (e.g., base controller 202 and/or the device controller 206), and so forth. It should be noted that while a single memory 210 is described, a wide variety of types and combinations of memory 210 (e.g., tangible, non-transitory memory) can be employed. The memory 210 can be integral with the base controller 202 and/or the device controller 206, can comprise stand-alone memory, or can be a combination of both. Some examples of the memory 210 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The base station 108, the first user device 112 and/or second user device 120 each further includes a communication interface 214. The communication interface 214 can be operatively configured to communicate with components of the base station 108, the first user device 112 and/or second user device 120. For example, the communication interface 214 can be configured to retrieve data from the base controller 202 and/or the device controller 206 or other components, transmit data for storage in the memory 210, retrieve data from storage in the memory 210, and so forth. The communication interface 214 can also be communicatively coupled with the base controller 202 and/or the device controller 206 to facilitate data transfer between components of the base station 108, the first user device 112, and/or second user device 120. It should be noted that while the communication interface 214 is described as a component of the base controller 202 and/or the device controller 206, one or more components of the communication interface 214 can be implemented as external components communicatively coupled to the base controller 202 and/or the device controller 206 via a wired and/or wireless connection. It should be understood that the type or number of processors 208, memory, or communication interface may differ between the base station 108, the first user device 112 and/or second user device 120.

Figure 3A:
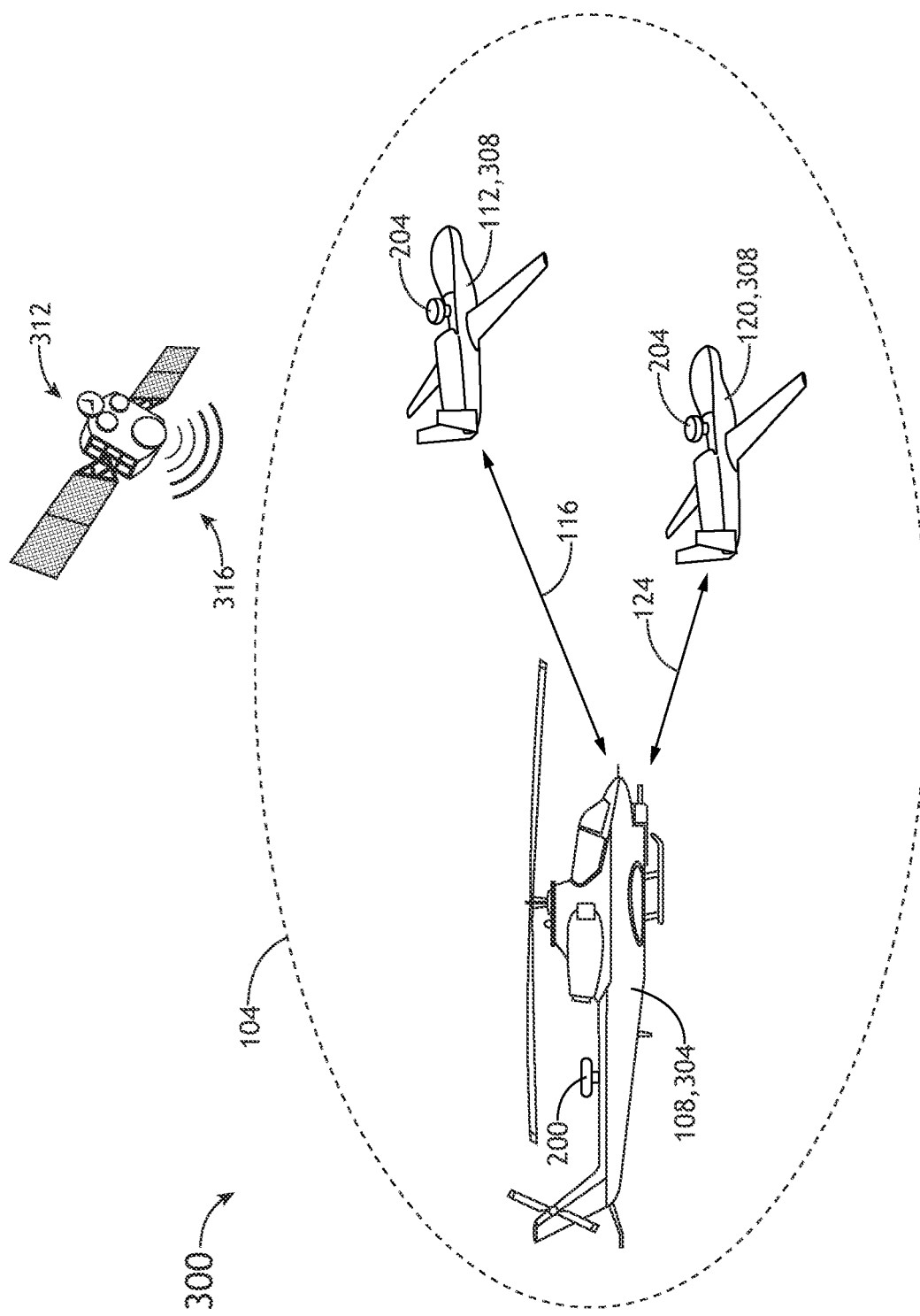
FIG. 3A is a diagram illustrating an ad hoc communication network in accordance with one or more embodiments of the disclosure.

FIG. 3A is a diagram illustrating an ad hoc communication network 300 in accordance with one or more embodiments of the disclosure. The ad hoc communication network 300 may contain one or more, or all, components of the ad hoc network 100, and vice versa. The base station 108 is configured as a helicopter 304. For example, the base station may be configured as a Future Arrack Reconnaissance Aircraft (FARA) helicopter. The helicopter 304 includes the base transceiver 200 located either externally or internally to the body of the helicopter 304. In some embodiments, the ad hoc communication network 300 is configured as a 5G network.

In some embodiments, the ad hoc communication network 300 further includes the first user device 112 and/or second user device 120 configured as air launched affects (ALE) 308, each comprising a device transceiver 204. ALEs 208 are small unmanned aerial vehicles carried aboard and released from a larger aircraft (e.g., such as the helicopter 304). As shown in FIG. 3A, the ALEs 308 are capable of communicating with each using the helicopter 304 as the relay (e.g., base station 108). In this manner, the base station 108 in the form of a helicopter 304 may transport one or more ALEs 308 acting as first user devices 112 and/or second user devices 120 to a mission area.

In some embodiments, the ad hoc communication network 300 includes a first mission set of first user devices 112 (e.g., the first user device 112 configured as the first mission set). The ad hoc communication network 300 may also include a second mission set of second user devices 120 (e.g., the second user device 120 configured as the second mission set). The first mission set and the second mission set may each receive communication resources from the base station upon launch. For example, the first mission set and the second mission set may each have differing mission objectives, but the communication resources for the first mission set and the second mission set are shared. There is no requirement for devices within the first mission set to be aware of devices within the second mission set, or vice versa, however, the first mission set and second mission set must be managed in a way to prevent interference between the first mission set and the second mission set.

Once the ALEs 308 are deployed, the helicopter 304 and the ALEs 308 may organize into one or more ad hoc communication networks 300. For example, the helicopter may deploy two sets of ALEs having two separate mission objectives, with each set also forming separate ad hoc communication networks 300 with the helicopter operating as the base station for both networks. In another example, all ALEs 308 deployed form the helicopter 304 may form a single ad hoc communication network 300. In practice, multiple helicopters 304 may transport and deploy multiple sets of ALEs 308 into cells 104 having adjacent or overlapping areas. In these cases, ALEs 308 may switch from one base station 108/helicopter 304 to another based on predetermined rules and conditions (e.g., an ALE 308 may switch base stations 108 if upon communication disruption of the originally linked base station). In another example, ALEs 308 may also be configured to retain linkage to the original base station 108/helicopter via ProSe relay or other D2D methods.

In some embodiments, the ad hoc communication network 300 further includes a communication satellite 312 (e.g., a Global Positioning System (GPS) satellite) configured to send a GNSS synchronization signal 316 (e.g., L1 C/A, L2C, L5 or L1C signals) to the base station 108/helicopter the first user device 112/ALE 308 and/or second user device 120/ALE 308. In the context of the ad hoc communication network, the GNSS synchronization signal 316 may be received by the base station 108, which correspondingly sends synchronization data based on the GNSS synchronization signal to the first user device 112 and/or second user device 120 via the first signal 116 and/or second signal 124. In case of a disruption of communication between the base station 108 and the first user device 112 and second user device 120, the GNSS synchronization signal 316 may be received directly by the first user device 112 and the second user device 120. With both the first user device 112 and second user device 120 synchronized via the GNSS synchronization signal 316, a direct and stable ProSe communication link between the first user device 112 and the second user device 120 may be maintained for long periods of time without succumbing to drifting by that can occur by oscillators and real-time clocks often used in user devices.

Figure 3B:
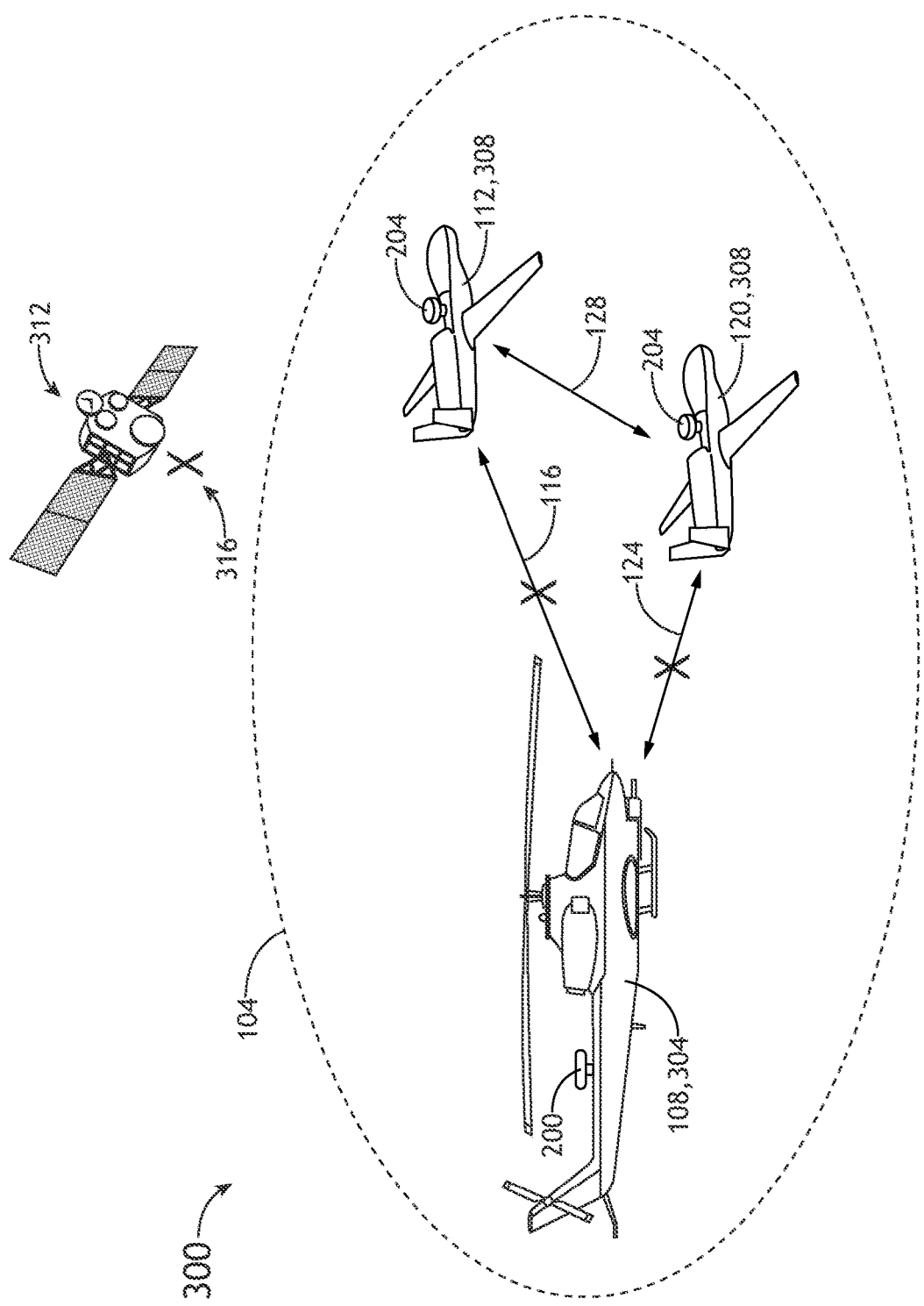
FIG. 3B is a diagram illustrating the ad hoc communication network configured in a compromised communication environment, in accordance with one or more embodiments of the disclosure.
Figure 3C:
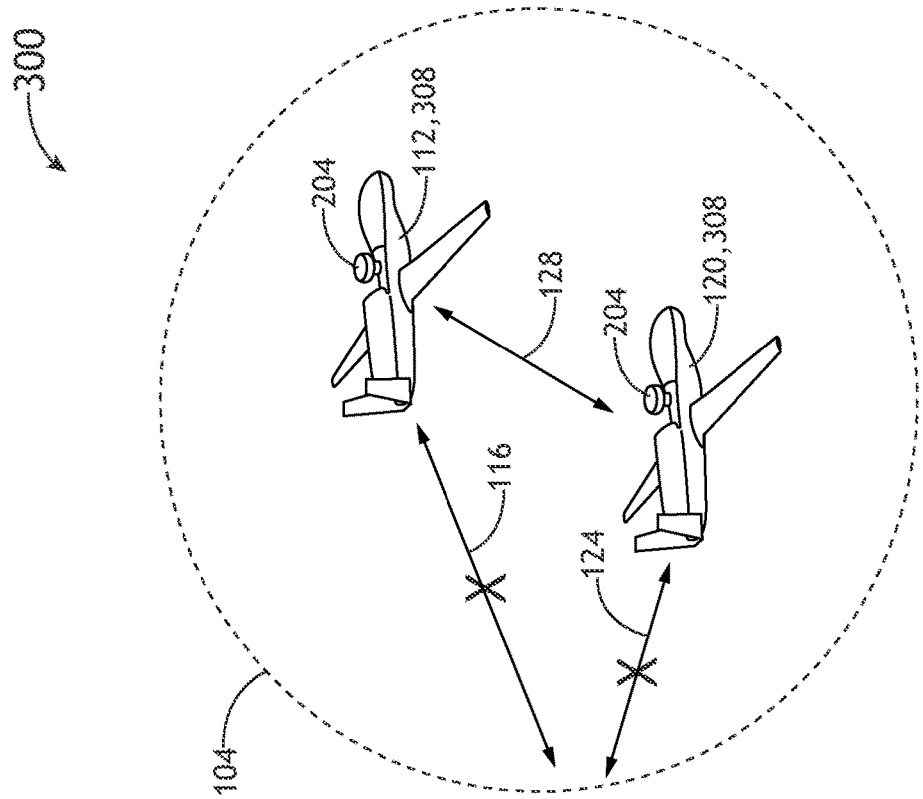
FIG. 3C is a diagram illustrating the ad hoc communication network configured in a compromised communication environment, in accordance with one or more embodiments of the disclosure.
Figure 3C:
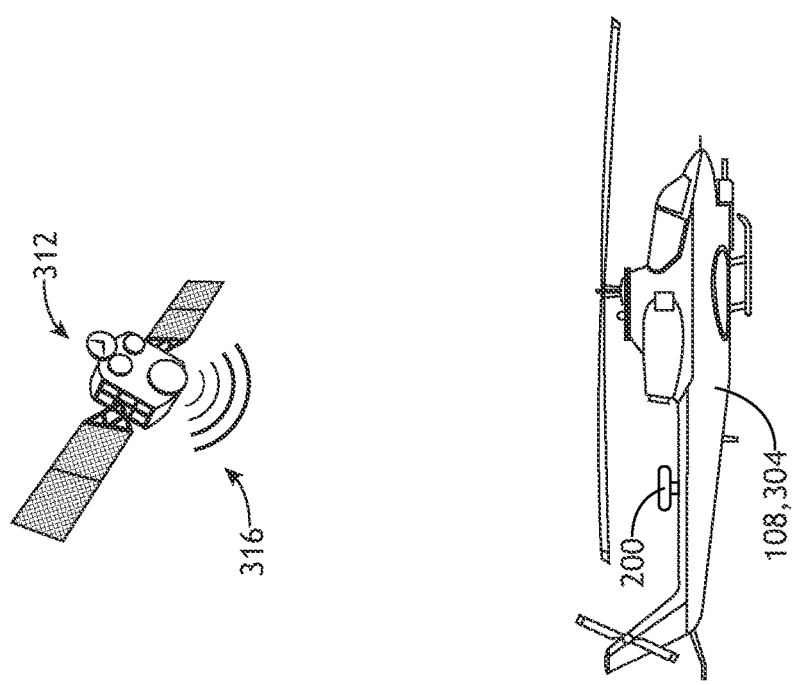

FIGS. 3B and 3C are diagrams illustrating the ad hoc communication network 300 configured in a compromised communication environment, in accordance with one or more embodiments of the disclosure. As shown in FIG. 3B, the first signal 116, second signal 124, and GNSS synchronization signal 316 (e.g., a commercial GNSS synchronization signal) may be compromised by various mechanisms. For example, the signals may be deliberately jammed by an adversarial agent. For instance, an adversary may operate a high-powered transmitter tuned to the GNSS synchronization signal 316, preventing the base transceiver 200 and/or device transceiver 204 from successfully receiving the signals. In another example, the first signal 116, second signal 124, and/or GNSS synchronization signal 216 may be compromised via electromagnetic interference from natural (e.g., lightning storms) or artificial sources.

In some embodiments, the compromised GNSS synchronization signal 316 is configured as a commercial GNSS synchronization signal 316 from commercial GNSS satellites. These commercial GNSS satellites may include but not be limited to commercial GNSS satellites from Global Positioning System (GPS), GLONASS, Galileo, BeiDou, QZSS, IRNSS, or NAVIC systems. For example, the commercial GNSS synchronization signal 316 may be blocked or otherwise denied from a GPS satellite. These commercial GNSS satellites may also transmit military GNSS synchronization signals. For example, a GPS satellite may also transmit M-code signals that are more resistant to jamming than commercial GNSS synchronization signals 316. Systems and methods to overcome commercial and/or military GNSS synchronization signals 316 are described herein.

As shown in FIG. 3C, the first user device 112 and second user device 120 may travel out of range of the base station 108, preventing communication. Many wireless waveforms have constraints on the distances between communication devices. For example, 5G signals may be limited to ranges within a few kilometers (e.g., 1-4 kilometers under current commercial configurations), to approximately 100 km under certain configurations (e.g., such as having a base station in the communication path). A first user device 112 and/or second user device 120 that travels further than the allowable distance between them and a base station 108 will eventually isolate themselves within their own cell 104, unable to communicate with the base station 108, and only able to communicate via D2D. As previously discussed, once communication with the base station 108 is compromised, the first user device 112 and second user device 120 have a limited time period for robust and competent D2D communication due to oscillator and real-time clock drift. In some cases, first user device 112 and second user device 120 may be able to directly receive GNSS synchronization signals 216, however, the GNSS synchronization signals 316 may also be compromised due to jamming/spoofing or otherwise blocked due to obstacles (e.g., caves, valleys), atmospheric conditions, or other issues. The inability of the first user device 112 and the second user device 120 to access either the base station 108 or the GNSS synchronization signals 316 considerably constrains the first user device 112 and second user device timing and synchronization characteristics.

Figure 4:
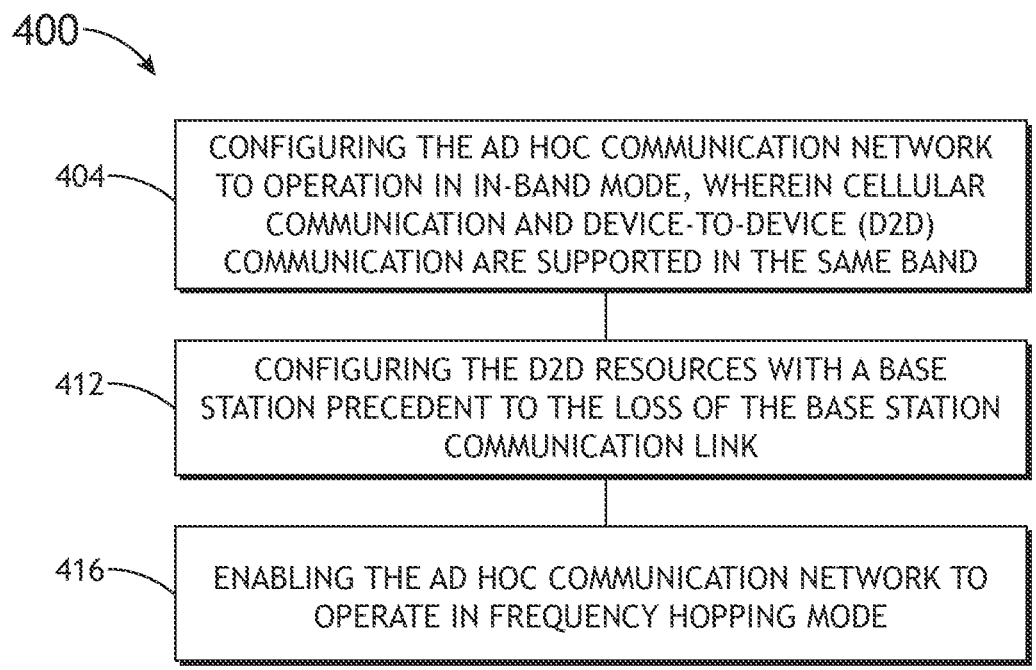
FIG. 4 is a flowchart illustrating a method of operating an ad hoc communication network under suboptimal commercial GNSS conditions and a subsequent loss of a base station.

FIG. 4 is a flowchart illustrating a method 400 of operating an ad hoc communication network 100 under suboptimal commercial GNSS conditions and a subsequent loss of a base station 108. The method provides a relatively low-cost solution to operating the ad hoc communication network 100 under suboptimal time-synchronization conditions (e.g., adverse denial conditions) and is implemented by systems and componentry described herein that ensure time synchronization.

In some embodiments, the method 400 includes a step 404 of configuring the ad hoc communication network 100 to operate in in-band mode, wherein cellular communication and D2D communication are supported in the same band (e.g., the ad hoc network is configured with one frequency carrier for relay and D2D operations). For example, operating the third signal 128 (e.g., the D2D signal) may be configured to use the same frequency of the first signal 116 and second signal 124. This configuration simplified switching from cellular to D2D communication if base station 108 communication is abruptly and unexpectedly compromised. This configuration of the ad hoc communication network may be carried out at least in part by the base controller 202 and/or the one or more device controllers 206. It should be understood that communication from the base station 108 may be denied. Therefore, the first user device 112 and/or second user device 120 may rely on the base station 108 only for the initial timing and operation configuration information.

In some embodiments, the method may further include a step of configuring the ad hoc communication network 100 to operate in overlay mode, wherein communication resources (e.g., time frequency blocks) are divided between network-controlled resources and D2D resources. For example, once the first user device 112 and/or second user device 120 is out of range of the base station 108, the first user device 112 and/or second user device 120 may utilize base station resources to find the location of each other (e.g., the first user device 112 or second user device 120). Overlay mode may also be configured (e.g., via the base controller 202 and/or the one or more device controllers 206) so that gains may be made be in time division duplex (TDD) or other waveform applications without while reducing or eliminating interference. Furthermore, overlay mode permits sharing of communication resources between base station and users do that once out of base station 108 range, the first user device 112 uses base station resources to find where the second user device 120 is using directional communication instead of omnidirectional communication.

In some embodiments, the method 400 further includes a step 412 of configuring the D2D resources with the base station 108 precedent to the loss of the base station communication link (e.g., the communication linkage responsible for sending and receiving the first signal 116 and or second signal 124). For example, in the ad hoc communication network 300, the ALE 308 may synchronize with the base station 108/helicopter 304 before leaving for the mission. By synchronizing (e.g., via the base controller 202 and/or the one or more device controllers 206) immediately before deployment, the ALEs may communicate with each other (e.g., upon a compromised first signal 116 and/or second signal 124) for optimal lengths without interference via oscillation or real-time drift of internal clocks within the ALEs.

In some embodiments, the method 400 further includes a step 416 of enabling the ad hoc communication network 100 to operate in a frequency hopping mode. For example, the first user device 112 and the second user device 120 may communicate (e.g., via D2D) by switching the third signal 128 among several frequency channels. The hopping may occur between subframes or within a subframe of a duplex or multiplex frame. Through frequency hopping (e.g., via the base controller 202 and/or the one or more device controllers 206), resources for a specific mission may be deconflicted and used efficiently by users (e.g., first user device 112 and/or second user device 120) assigned to a mission.

In some embodiments, the method 400 may further include a step of enabling physical sidelink control channel (PSCCH) synchronization for the first user device 112, wherein the first user device 112 is configured to provide short-range timing to the second user device 120 via the PSCCH synchronization. For example, several communication standards have now defined new physical channels to support ProSe via PSCCH, as well as Physical Sidelink Feedback Channel (PSFCH) and Physical Sidelink Shared Channel (PSSCH).

In embodiments, synchronization information may be broadcast over the PSCCH. The first user device 112 and/or second user device 120 may then monitor the PSCCH to determine what channel and/or resources are being used by each other. Although a low-cost solution for synchronization of the first user device 112 and/or second user device 120, the PSCCH transmissions may be received by adversarial agents that may subsequently target the first user device 112 and/or second user device 120, or disrupt PSCCH broadcasts. Under such circumstances, nonstandard mechanisms for sidelink resource management may be deployed.

Two type of frequency hopping are supported by the PSCCH, fixed frequency hopping and pseudo-random frequency hopping. For example, the first user device 112 and/or second user device 120 may operate using the pseudo-random frequency hopping mode, wherein the first user device 112 and/or second user device 120 may be configured with an appropriate number of sub-bands ($N_{sb}$) and unique seeds to initialize a pseudorandom sequence generator.

In some embodiments, the method 400 may further include a step of assigning different frequency resources between the first user device 112 and a second user device 120 within range of the first user device 112, wherein the first user device 112 and the second user device 120 are configured with different mission objectives. By assigning different frequency resources to the first user device 112 and the second user device 120, inter-mission interference may be limited to an acceptable level.

Figure 5:
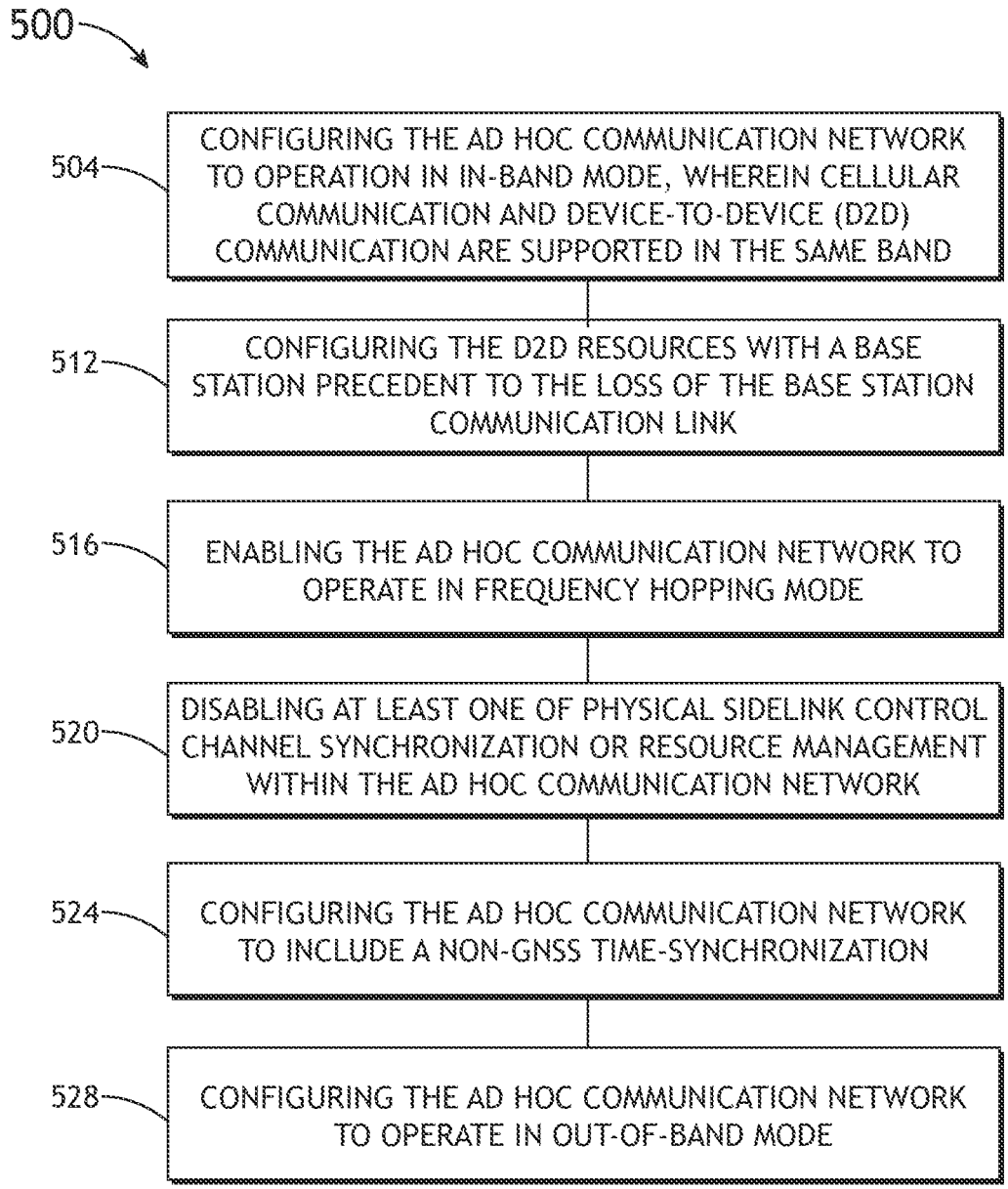
FIG. 5 is a flowchart illustrating a method of operating an ad hoc communication network under suboptimal commercial GNSS conditions and a subsequent loss of a base station in a tactical environment, in accordance with one or more embodiments of the disclosure.

FIG. 5 is a flowchart illustrating a method 500 of operating an ad hoc communication network 100 under suboptimal commercial GNSS conditions and a subsequent loss of a base station 108 in a tactical environment, in accordance with one or more embodiments of the disclosure. The method 500 provides a solution to operating the ad hoc communication network 100 under suboptimal time-synchronization conditions that is more secure than method 400. Method 500 may contain one or more, or all elements and/or steps of method 400, and vice-versa. For example, the method 500 includes steps 504, 512, and 516 that are similar or equivalent to steps 404, 412, and 416, respectively.

In some embodiments, the method 500 further includes a step 520 of disabling at least one of PSCCH synchronization and resource management (e.g., via the base controller 202 and/or the one or more device controllers 206). As discussed herein, PSCCH is vulnerable to an attack in a tactical environment. Denial of the PSCCH would prevent the first user device 112 and/or second user device 120 from synchronizing to the ad hoc communication network 100 and from using communication resources within the ad hoc communication network 100.

In some embodiments, the method further includes a step 524 of configuring the ad hoc communication network (e.g., via the base controller 202 and/or the one or more device controllers 206) to include a nonstandard-GNSS time-synchronization method. There are several nonstandard-GNSS time-synchronization methods available, or currently in development, that may successfully synchronize the first user device 112 or second user device 120 in the absence of the base station 108 (e.g., via the first signal 116 and/or second signal 124) and/or GNSS synchronization signal 316. For example, several nonstandard-GNSS time-synchronization methods and technologies are employed in an assured position, navigation, and timing (A-PNT) system, currently under development.

A-PNT systems provide position, navigation, and timing communication support from multiple technologies within a single source. A-PNT systems currently under development include dismounted assured PNT systems (DAPS) and mounted assured PNT systems (MAPS). DAPS is intended to replace the defense advanced GPS receivers (DAGR) and/or commercial GPS systems in some environments (e.g., military/tactical environments), and are small enough to be carried by infantry, first responders, or ALEs 308. For example, an infantryman may be equipped with a DAPS module (e.g., disposed within a backpack) that connects to, or is integrated with, a radio, battery, and an end user device). MAPS and DAPS are an augmentation to GPS receivers such as the Defense Advanced GPS Receiver (DAGR) that are resilient to denial by adversaries.

Figure 6A:
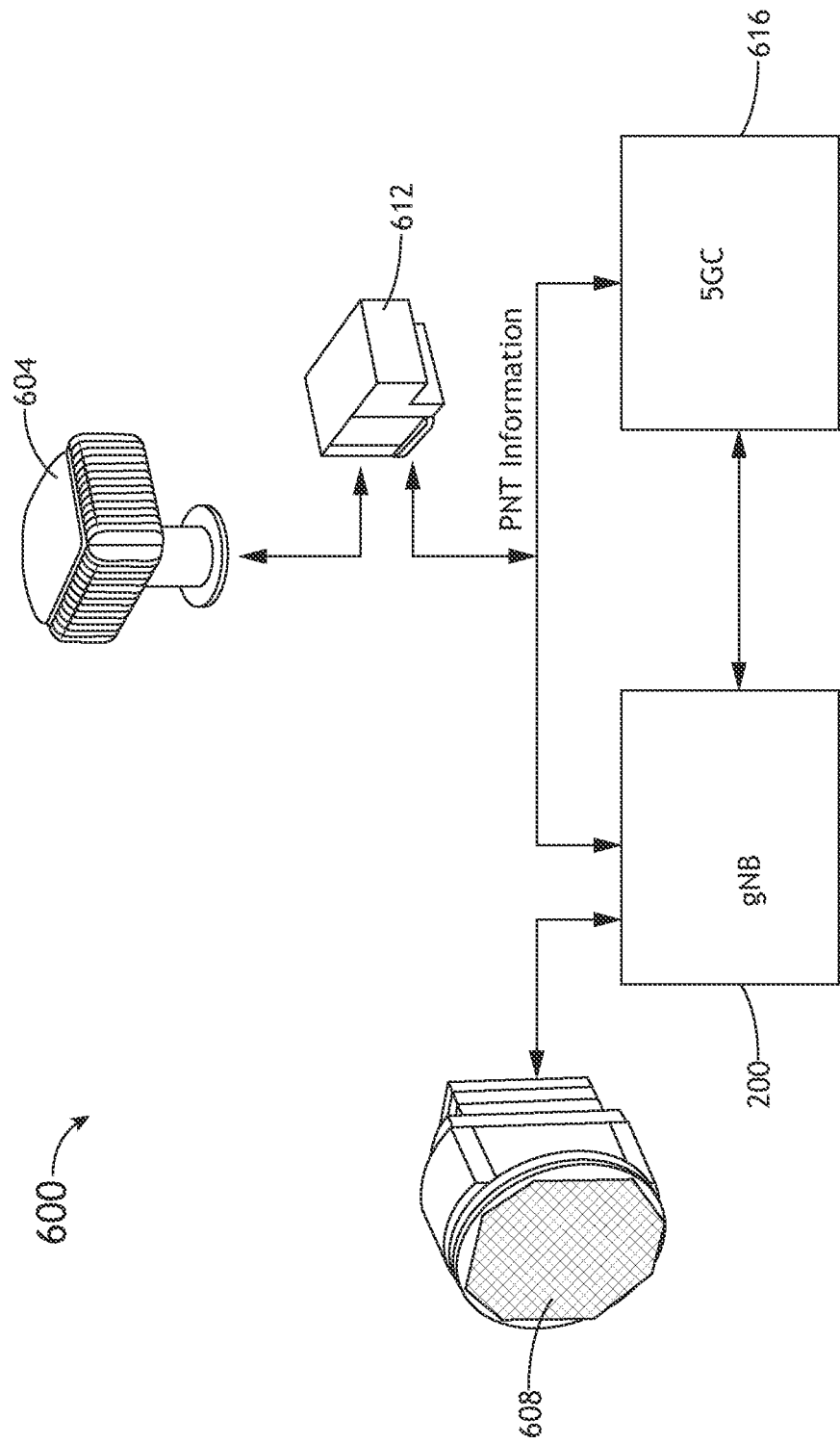
FIG. 6A is a drawing illustrating a MAPS for use in a base station, in accordance with one or more embodiments of the disclosure.
Figure 6B:
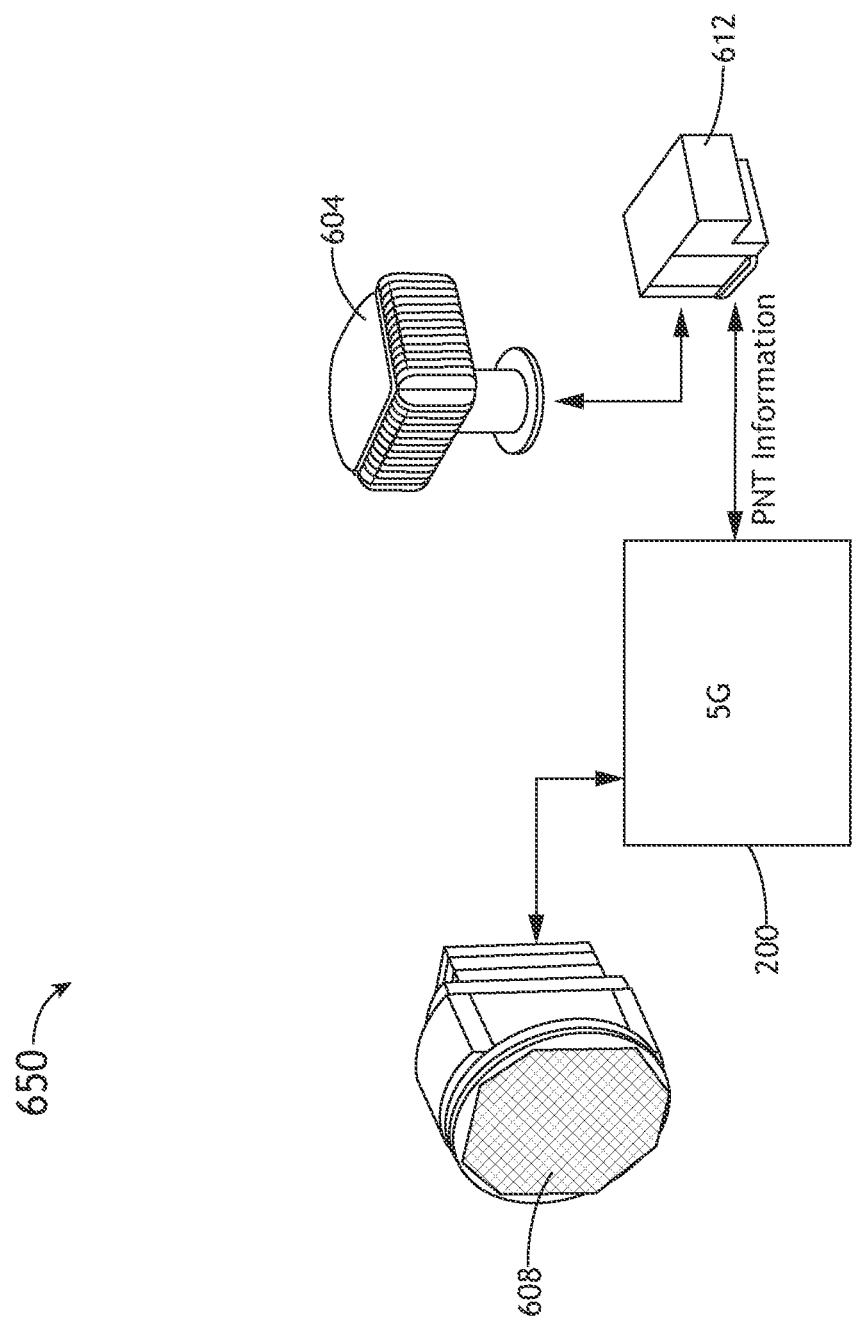
FIG. 6B is a drawing illustrating a MAPS for use in a first user device, or a second user device, in accordance with one or more embodiments of the disclosure.

MAPS offers A-PNT solutions and may be implemented in vehicles (e.g., aircraft, trucks, transports, or large ALEs). For example, MAPS may be implemented as a line-replacement unit (LRU) on-board a mobile command post. An example of an ad hoc communication system utilizing MAPS is shown in FIGS. 6A and 6B. DAPS one or more, or all, of the same functions as MAPS, but is packaged in a dismounted SWAPc form factor.

FIG. 6A is a drawing illustrating a MAPS 600 for use in a base station, in accordance with one or more embodiments of the disclosure. For example, the MAPS 600 may be disposed within a helicopter 304 operating as a base station 108. The MAPS 600 may one or more antennas or antenna systems that comprise one or more A-PNT components. For instance, the MAPS may include a multi-sensor antenna system 604 and/or a mid-band/high-band antenna array 608. In another example, the MAPS 600 may include a navigation system module 612. Data from the multi-sensor antenna system 604, the mid-band/high-band antenna array 608, and/or the navigation system module 612 may be received by an evolved packet core 616, containing networking elements that provide a framework for supporting the ad hoc communication network 100. Data is also shared with the base station transceiver 200 (e.g., gNB), which then transmits data to and from the device transceiver 204.

A-PNT technology used within the ad hoc communication network 100 may be configured for any type of channel access method including but not limited to frequency division multiple access (FDMA), time division multiple access (TDMA), code division multiple access (CDMA), space division multiple access (SDMA), spread spectrum multiple access, power division multiple access, any type of packet mode method, any type of duplexing methods, or any technology configured division of signals into frames, subframes, slots, and/or subslots. For example, an A-PNT technology may transmit and/or receive signals within specific allocated slots.

FIG. 6B is a drawing illustrating a MAPS 650 for use in a first user device 112 or a second user device 120, in accordance with one or more embodiments of the disclosure. For example, the MAPS 650 may be disposed within an ALE 308. The MAPS 650 may one or more antennas or antenna systems that comprise one or more A-PNT components. For instance, the MAPS 650 may include the multi-sensor antenna system 604 and/or the mid-band/high-band antenna array 608. The MAPS 650 may include a navigation system module 612. Data from the multi-sensor antenna system 604, the mid-band/high-band antenna array 608, and/or the navigation system module 612 may be received by the device transceiver 204 (e.g., a 5G cell phone), which then transmits data to and from the device transceiver 200.

Figure 6C:
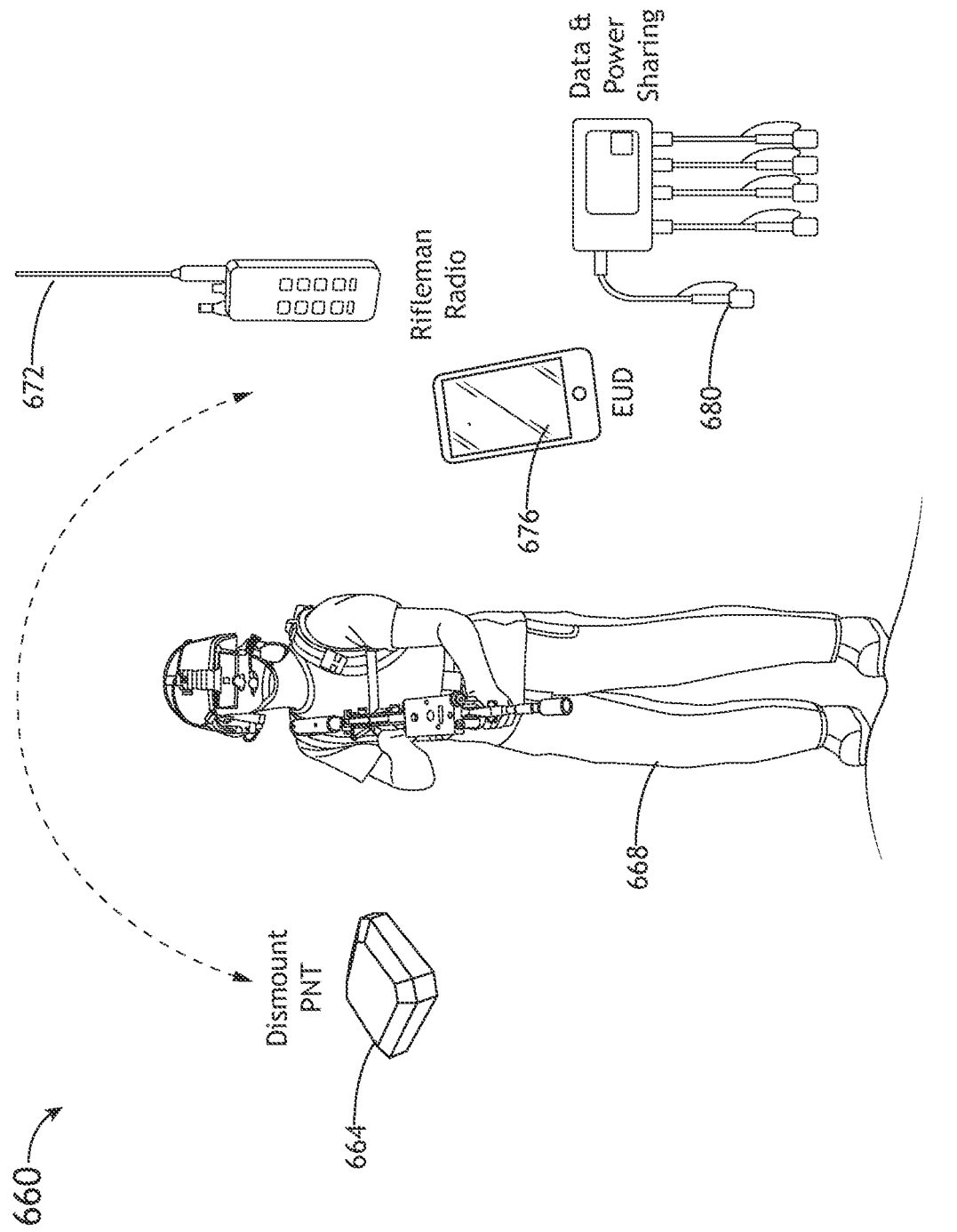
FIG. 6C is a drawing illustrating a DAPS for use in a first user device, or a second user device, in accordance with one or more embodiments of the disclosure.

FIG. 6C is a drawing illustrating a system 660 for using a DAPS module 664 for use in a first user device 112 or a second user device 120, in accordance with one or more embodiments of the disclosure. In particular, the system 660 may be used by an infantryman 668 or other dismounted person/unit. The system 660 may include other componentry communicatively linked to the DAPS module 664 including but not limited to a radio 672 (e.g., a hand-held rifleman radio), an end user device 676 (e.g., a smartphone), and a data/power sharing unit 680.

It should be understood that commercial GNSS service may be readily deniable by an adversary, whereas military GNSS service (e.g., GPS service) is considerably more robust. The MAPS/DAPS system as described herein employ techniques that improve the performance of commercial and/or military GNSS services. For example, if an adversary denies an entire first signal band and an entire second signal band, and sidelink communication also fails, 5G service may then be deployed as a wide band (e.g., a 100 MHz band below 6 GHz, or a 1 GHz band within mmWave). Denying wide bands is difficult for an adversary, leading them to focus on specific aspects of signal denial such as denying synchronization with timing sources. Disabling sidelink synchronization causes users to constantly change communication resources, forcing an adversary to deny the entire band. The MAPS/DAPS systems and methods described herein enables the maintenance of synchronization with military GNSS signals under adverse conditions, with a time resolution that allows frequency changes with low risk of interference from other users.

In some embodiments, missions performed via the ad hoc communication network 100 may be given specific identification numbers. A base station 108 may pre-allocate communication resources, security parameters, IP addresses, and other mission components, and assign them to a specific group identification number. A mission may be assigned multiple group identification numbers. The pre-allocation of resources allows a first user device 112 and/or second user device 120 to use these communication resources when the first user device 112 and/or second user device 120 is out of range of the base station 108 (e.g., a scheme based on the concept of resource pools that is defined as a part of 3GPP standards). The pre-allocation also gives the first user device 112 and/or second user device 120 the flexibility to decide which resource pool to use, and when to use the resource pool. By doing so, the pre-allocation also permits the use of mission specific transmission security (TRANSEC) keys that may determine the time and frequency of the resources. This also permits the use of mission specific TRANSEC keys so that users of a mission can use the resources in a contention free manner without broadcasting any resource details. The number of resource pools required for a mission may be allocated based on the threat environment (e.g., the anticipated congestion of the theatre)

Nonstandard-GNSS time-synchronization methods used by the ad hoc communication network 100 may include any type, number, or combination of technologies including but not limited to Wi-Fi, cellular (e.g., 2G, 3G, 4G, 5G, 6G), vision systems, advanced GNSS technologies (e.g., anti-jam antennas, encryption, anti-spoofing technologies), use of low earth orbit (LEO) communication satellites, long range navigation (LORAN) systems, celestial navigation systems, very high frequency omni-directional beacon systems (e.g., VORTAC, DME, or ILS), radar, lidar, sonar, RFID, map matching, inertial sensors, precision clocks (e.g., chip scale atomic clocks (CSAC), single-chip timing and inertial measurement units (TIMU), and cold atom microsystems), odometer readings, anti-jam algorithms, and crowdsourcing. One or more of these technologies may be incorporated into the ad hoc communication network 100 via stand-alone devices, multiplexed devices, or A-PNT systems such as MAPS. For example, the ad hoc communication network 100 may incorporate an antenna system that includes anti-jamming technology for Y-Code and/or M-Code GPS service. For instance, the ad hoc communication network 100 may utilize military GPS services (e.g., using M-Code or Y-Code communication) via the MAPS and/or DAPS. The antenna system may further include a navigation antenna, a barometer, and/or orientation sensors.

In some embodiments, one or more nonstandard-GNSS time-synchronization methods may incorporate one or more technologies configured as a low-cost ground attritable sensor. For example, a sensor, such as a CSAC, may be slaved to the base station 108 so that both the base station 108 and the sensor to be time and frequency aligned. In this manner, a group of ALEs, each comprising a slaved sensor, can synchronize amongst themselves and perform the duties of the mission independent of the base station 108.

In some embodiments, the method 500 further includes a step 528 of configuring the ad hoc communication network 100 to operate in out-of-band mode. For example, first user device 112 may be configured to communicate with the base station 108 via the cellular band, but communicate with the second user device 120 via industrial, scientific, and medical (ISM) band, public safety band, or military bands (e.g., out-of-band mode does not necessarily refer to the ISM out-of-band mode as per 5G standards). By utilizing an out-of-band mode, administrators may remotely control and manage critical IT assets and network equipment using a secure connection through a secondary interface that is physically separate from the primary network connection, which enables administrators to gain control even during infrastructure faults.

Out-of-band operation is difficult in commercial communication systems, as there are additional requirements (e.g., listen-before-talk used by Bluetooth and Wi-Fi) that are not supported by sidelink. Noncommercial communication systems, such as military communication systems, may use out-of-band mode as long as the base station 108 and the first user device 112 and/or second user device 120 have coverage in that band. Specific frequencies (e.g., 3.1 to 5 GHz) have been reserved for military use for cellular communication and establishment of co-primary status for both military and cellular operations, enabling the designation of co-primary bands as "out-of-band", deploying sidelink services when needed.

In embodiments, the systems and methods described herein facilitate noncommercial ad hoc networks (e.g., military networks) in their ability to configure every aspect of the network on a per mission basis, providing required consistency checking to ensure interoperability and seamless operations, such as in making pre-configured sidelink missions work reliably. In contrast, commercial networks, particularly networks that include different vendors (e.g., Verizon or T-Mobile) have little or no coordination. For example, two commercial vendors can assign pre-configured sidelink resources, but there is no guarantee of interoperability. In another example, a commercial base station can allocate its own communication resources in a multiple vendor network to a user device, but there may be no mechanism when handing-off the user device to the next commercial base station to reevaluate preconfigured resources and reconcile them. In another example, there is no requirement or enforcement in commercial networks that all sidelink participants are from the same base station allocation. Because of this, all commercial networks must rely on the sidelink control channel and dynamically allocate resources.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system for operating an ad hoc communication network under suboptimal commercial global navigation satellite system (GNSS) conditions and a loss of a base station communication link comprising:
    a base station;
    a first user device; wherein the base station and the first user device are configured to communicate via a first signal; and
    a second user device configured to communicate with the base station via a second signal; wherein the base station is configured to operate as a relay between the first user device and the second user device;
    wherein the first user device and the second user device are configured to communicate directly without the use of the base station; wherein the first user device and the second user device communicate via a third signal;
    the first user device comprising:
        a transceiver configured to communicate with the second user device;
        a memory configured to perform an instruction;
        a processor configured to execute the instruction stored by the memory, wherein the instruction enables the processor to:
        configure the first user device to operate in in-band mode, wherein cellular communication and device-to-device (D2D) communication are supported in a same band; wherein the third signal is configured to use the same frequency of the first signal and the second signal;
        configure the first user device to operate in overlay mode, wherein communication resources are shared between network-controlled resources and D2D resources;
        configure the D2D resources with a base station precedent to the loss of the base station communication link;
        enable the first user device to operate in frequency hopping mode; wherein the first user device and the second user device are configured to communicate by switching the third signal among several frequency channels;
        enable physical sidelink control channel synchronization for the first user device, wherein the first user device is configured to provide short-range timing to the second user device via the physical sidelink control channel synchronization; and
        disable the physical sidelink control channel synchronization within the first user device.

2. The system of claim 1, wherein the instruction further enables the processor to:
    disable resource management within the first user device; and
    configure the first user device to include a nonstandard-GNSS time-synchronization method.

3. The system of claim 1, further comprising the second user device configured for D2D communication with the first user device.

4. The system of claim 3, wherein the instruction further enables the processor to configure the first user device to operate in out-of-band-mode.

5. The system of claim 1, wherein the instruction further enables the processor to assign differing frequency resources between the first user device and the second user device within range of the first user device, wherein the first user device and the second user device are configured with differing mission objectives.

6. The system of claim 5, wherein the ad hoc communication network is configured as a fifth generation (5G) network.

7. The system of claim 6, wherein the first user device is configured as an air launched effect.

8. The system of claim 1, comprising:
    a first mission set of first user devices; and
    a second mission set of second user devices; wherein communication resources for the first mission set and the second mission set are allocated from the base station.

9. The system of claim 1, wherein the frequency hopping occurs between subframes.

10. The system of claim 1, wherein the frequency hopping occurs within a subframe of a duplex or multiplex frame.

* * * * *